United States Patent [19]

Bailey

[11] Patent Number: 4,827,786
[45] Date of Patent: May 9, 1989

[54] PRELOADED ANTIBACKLASH GEAR ASSEMBLY

[75] Inventor: Edward J. Bailey, Cincinnati, Ohio

[73] Assignee: Cincinnati Milacron Inc., Cincinnati, Ohio

[21] Appl. No.: 13,409

[22] Filed: Feb. 11, 1987

[51] Int. Cl.⁴ .............................................. F16H 55/18
[52] U.S. Cl. .......................................... 74/409; 464/97
[58] Field of Search ........................ 74/409, 392, 440; 464/97

[56] References Cited

U.S. PATENT DOCUMENTS

| | | | |
|---|---|---|---|
| 2,283,606 | 5/1942 | Lewis | 123/52 |
| 2,655,050 | 10/1953 | Divette et al. | 74/409 |
| 3,020,775 | 2/1962 | Musser | 74/440 |
| 3,151,494 | 10/1964 | Sedgewick | 74/409 |
| 3,167,967 | 2/1965 | Silberger | 74/409 |
| 3,252,356 | 5/1966 | Lafferty | 74/799 |
| 3,396,594 | 8/1968 | Walker | 74/409 |
| 3,398,595 | 8/1968 | Clutter | 74/409 |
| 3,793,899 | 2/1974 | Bourbonnaud | 74/409 |
| 4,036,075 | 7/1977 | Lassanske | 74/409 |
| 4,305,307 | 12/1981 | Kiunke | 74/409 |
| 4,398,863 | 8/1983 | Shum | 414/733 |
| 4,403,907 | 9/1983 | Koller et al. | 414/744 |
| 4,642,021 | 2/1987 | Kikuchi | 414/735 |
| 4,660,432 | 4/1987 | Damas | 74/409 |

FOREIGN PATENT DOCUMENTS

| | | | |
|---|---|---|---|
| 233520 | 3/1986 | Fed. Rep. of Germany | 74/409 |
| 55-83544 | 6/1980 | Japan | 74/409 |
| 9126166 | 7/1984 | Japan | 74/409 |

Primary Examiner—Leslie A. Braun
Assistant Examiner—Scott Anchell
Attorney, Agent, or Firm—Frost & Jacobs

[57] ABSTRACT

There is provided a backlash control rotation gear assembly for robotic applications, with such assembly comprising an input device to provide rotational force of a predetermined maximum torque. The system further includes a first drive gear which is connected to the rotational input device and a second drive gear which is connected to the first drive gear by an elastic torsion spring preloaded with a predetermined spring torque force. An output driven gear is connected to a moveable robotic part to be rotated, with such driven gear being connected to the first and second drive gears, wherein the first drive gear is driven by the rotational input device and the second drive gear is driven indirectly by the input device through the preloaded elastic torsion spring. The preloaded torque force of the elastic torsion spring maintains the intermeshing teeth of the first and second drive gears and the driven gear is loaded, substantially constant contact, thereby eliminating gear backlash normally encountered in such gear systems.

16 Claims, 4 Drawing Sheets

PRELOADED ANTIBACKLASH GEAR ASSEMBLY

TECHNICAL FIELD

This invention relates to a preloaded antibacklash gear assembly for robotic applications, and, more particularly, to a backlash control rotation gear assembly for robotic manipulators utilizing a preloaded dual drive gear train.

BACKGROUND ART

When a pair of gears are intermeshed in a drive train assembly, every gear tooth along the face of the respective gears is not in exact increment and/or alignment with corresponding gear teeth. Standard clearances and manufacturing tolerances permit small variations in gear tooth size, pitch and the like. This in turn causes the interacting surfaces of meshing gears to exhibit small gaps between their respective meshing teeth which can often permit the entrance of a limited amount of slack or backlash into the system. In applications such as robotic manipulators where accurate and steady movement is often critical to successfully accomplishing the task at hand, even a relatively small amount of such backlash can be very harmful. Moreover, where a series of gears and/or where several gear trains are connected together in one way or another, any such backlash in the system can become additive and cyclical. For example, where a series of gears are utilized to create rotational movement of a portion of a robotic manipulator, such backlash may cause the rotational movement to vary several degrees, and such variance may not necessarily be predictable. If the robotic manipulator is rotating an extended arm or the like, several degrees variance can become quite a substantial alignment problem at the distal end of the extended arm, thereby making the robotic manipulator much less accurate and, possibly, inappropriate for delicate operations.

The industry has attempted to control or eliminate gear backlash in various ways through the years. For example, two separate gear housings are sometimes used, utilizing timing belts to syncronize the drive gear inputs into a single driven gear. This arrangement depends upon the belts in the system to resiliently absorb any backlash which may be present. An alternate method used to minimize backlash problems is discussed in U.S. Pat. No. 4,403,907, which issued to F. H. Koller, et al. on Sept. 13, 1983. In particular, Koller et al. suggests that in order to eliminate unwanted axial backlash in their material handling apparatus, direct axial loading of the main guide shaft by a toggle linkage assembly is utilized. The toggle linkage assembly is designed to provide axial loading of the main guide shaft while permitting rotational movement about the axis of the main guide shaft.

In another robotic application where accurate registration of a rotating swing arm is required for a pick and place function, U.S. Pat. No. 4,398,863, which issued to L. Y. Shum on Aug. 16, 1983, teaches the use of an idler sprocket which can be adjusted to insure proper tensioning of the drive chain therewithin. While the Shum reference states that such an idler sproket can be used to "promote the elimination of backlash", it also incorporates the use of shot pins mounted on the swing arm which are designed to engage hardened bushings to insure proper indexing of the swing arm at each pick and place point location. In many robotic manipulator applications, however, the use of shot pins and bushings is not practical.

Consequently, despite all of the prior work done in this area, there remain problems of effectively and efficiently eliminating unwanted backlash commonly encountered in gear trains and the like in robotic manipulator applications. With prior art mechanisms, it was necessary to utilize inefficient timing belts, adjustable idler sprockets, shot pin and bushing interactions, or direct loading of moveable portions of the device. In modern robotic applications, the prior systems simply do not provide reasonable solutions for eliminating backlash in robotic manipulators designed to accomplish relatively critical location movements in a predictable and reliable manner.

DISCLOSURE OF THE INVENTION

It is an object of this invention to obviate the above-described problems.

It is another object in the present invention to provide a backlash control rotation gear assembly for robotic applications which can relatively simply and reliably eliminate backlash in the rotating system.

It is yet another object of the present invention to provide a backlash control rotation gear assembly for robotic applications which utilizes a dual gear system which can be preloaded to ensure the elimination of backlash therewithin.

In accordance with one aspect of the present invention, there is provided a backlash control rotation gear assembly for robotic applications, with such assembly comprising a rotational input means to provide rotational force of a pre-determined maximum torque. The system further includes a first drive gear which is connected to the rotational input means, and a second drive gear which is connected to the first drive gear by an elastic torsion spring means which is preloaded with a predetermined spring torque. An output driven gear is connected to a moveable robotic part to be rotated, with such driven gear being connected to the first and second drive gears, wherein the first drive gear is driven by the rotational input means and the second drive gear is driven indirectly by the rotational input means through the preloaded elastic torsion spring means. The preloaded torque of the elastic torsion spring maintains the intermeshing teeth of the first and second drive gears and the driven gear in loaded, substantially constant contact.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF THE INVENTION

Figure 1:
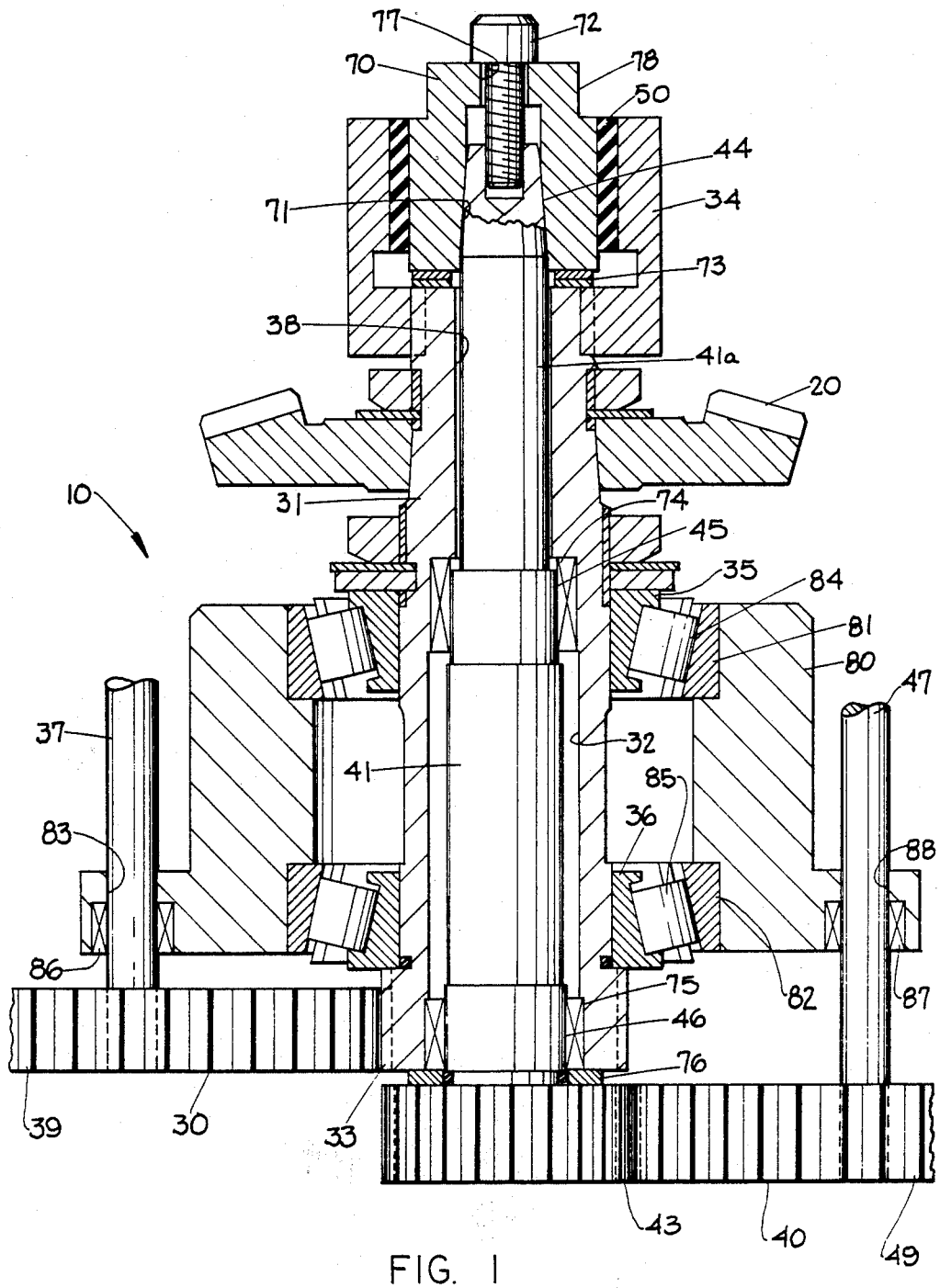
FIG. 1 is a verticle cross sectional view of a backlash control rotation gear assembly made in accordance with the present invention.

Referring now to the drawings in detail, wherein like elements indicate the same elements throughout the views, a backlash control rotation gear assembly 10 is shown in the cross sectional view of FIG. 1. Gear assembly 10 includes a rotational input means 20, shown in FIG. 1 as a beveled gear for interaction with other gear means (shown in FIG. 3) for connection to a rotational input source. Rotational input means 20 is designed to provide rotational force of a predetermined maximum torque to gear assembly 10 and is connected to a generally cylindrical first drive means 31 which is shown as including a hollow lower portion 32. First drive means 31 is further provided with external gear teeth 33 about its outer lower distal end, with such gear teeth 33 intimately meshing with corresponding gear teeth 39 formed about he periphery of first transfer gear or pinion 30. First transfer gear 30 is mounted on a central shaft 37 (shaft 37 not shown to scale). The upper portion of first drive means 31 includes a slightly enlarged hollow torsion spring housing 34.

First drive means 31 is also formed with an axial bore 38 extending from the lower inner surface of torsion spring housing 34 to hollow portion 32. A second drive means 41 is axially mounted within bore 38 and hollow portion 32. It is contemplated that bore 38 is to be formed with a diameter slightly larger than the outer diameter of the upper portion 41a of second drive means 41 to provide a comfortable, non-interference fit therewithin. Second drive means 41 includes a medial bearing seat 45 and a lower bearing seat 46 onto which bearings 74 and 75, respectively, can be pressed. Bearings 74 and 75 provide rotational support for second drive means 41 within hollow portion 32 of first drive means 31, and allow for a rotational movement of second drive means 41 relative first drive means 31. The lower distal end of second drive means 41 is similarly formed with external gear teeth 43 designed to intermesh with corresponding gear teeth 49 of second transfer gear or pinion 40 which is mounted on a central shaft 47 (shaft 47 not shown to scale, see FIG. 3). It is contemplated that transfer gears 30 and 40 might preferably be speed reducing gears, as shown, to provide more accurate rotational control of a moveable robot part. A friction damper ring 76 is shown as being mounted between the interface of the lower portions of first drive means 31 and second drive means 41, respectively. The function of friction damper 76 will be described in greater detail below.

The upper portion of second drive means 41 includes a tapered tip 44 which is generally located within the torsion spring housing 34 portion of first drive means 31. A drive means connector 70 is designed to telescope over tapered tip 44 and includes a correspondingly hollow tapered interior portion 71 and an aperture 77 formed to its upper central portion. Drive means connector 70 is designed to be connected to the tapered tip 44 of second drive means 41 during the preloading and connection of second drive means 41 to first drive means 31. In particular, drive means connector 70 is to be anchored within torsion spring housing 34 by means of elastic torsion spring means 50 located therebetween. It is contemplated that elastic torsion spring means 50 can be formed of any elastomeric material which can resiliently resist a predetermined amount of torque force (as commonly available under the Mark Torsilastic from B. F. Goodrich, Akron, Ohio). The exact choice of elastomeric material, thickness, and overall dimensions would, of course, be determined by the maximum of torque force which such material must be capable of resiliently resisting. The elastic torsion spring means 50 is to be permanently attached about its exterior surface to the inner surface of housing 34, and about its inner surface to the outer portion of drive means connector 70. The exact manner of connecting such elastic torsion spring means 50 between torsion spring housing 34 and drive means connector 70 is not critical and can be accomplished in a variety of manner such as by adhesive connection and/or mechanical attachments.

During assembly, the tapered tip 44 of second drive means 41 is fed into the tapered hollow interior 71 of drive means connector 70, and a threaded fastener 72 can be used to draw a tapered tip 44 further thereinto. A biasing means 73 (e.g. a Belleville spring or the like) is shown between the lower edge of drive means connector 70 and the upper inner surface of torsion spring housing 34.

Figure 3:
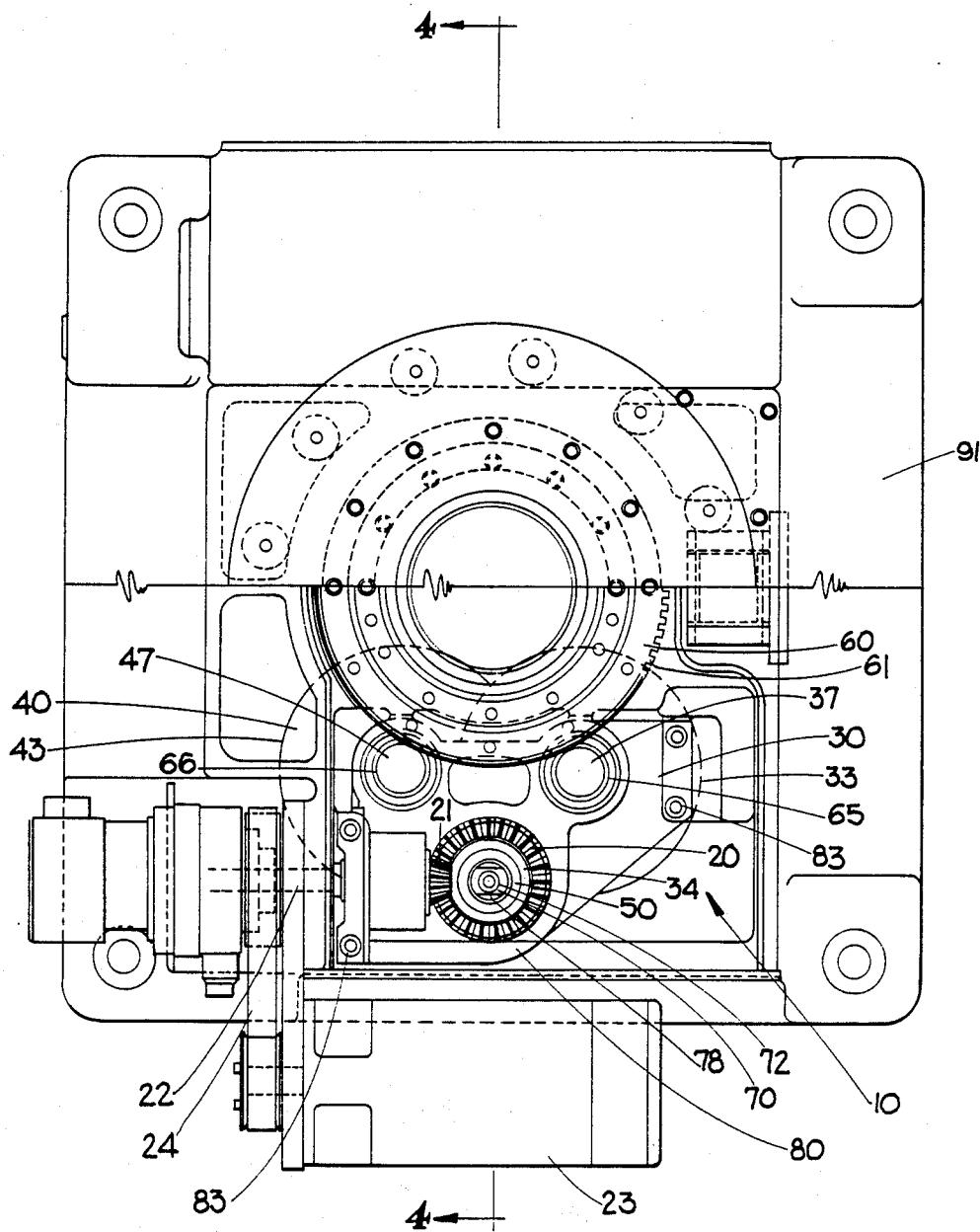
FIG. 3 is a top view, partially broken away, of the backlash control rotation assembly of FIG. 1 mounted in the base of a robotic manipulator as the rotation gear for the turret of such manipulator.

Backlash control rotation gear assembly 10 is shown as being rotatably mounted within an assembly anchor 80. Assembly anchor 80 is shown simply as an example of means of attaching gear assembly 10 to a robotic manipulator. In particular, assembly anchor 80 is shown as including bearing races 81 and 82 corresponding to similar bearing races 35 and 36 formed about the outer periphery of first drive means 31. In this regard, first drive means 31 is shown as being rotatably attached to assembly anchor 80 via bearings 84 and 85. Obviously, first transfer gear or pinion 30 and second transfer gear or pinion 40 must also be anchored to the robotic manipulator through their shafts 37 and 47, respectively. It is contemplated that shafts 37 and 47 could likewise conveniently be supported by assembly anchor 80 as through bores 83 and 88 and bearings 86 and 87, respectively. The upper ends of shafts 37 and 47 (not shown in FIG. 1) are attached to first and second drive gears 65 and 66 (as shown in FIG. 3). First and second drive gears 65 and 66 provide the rotational driving force to output driven gear 60. In the embodiment illustrated in FIG. 4, output driven gear 60 is shown as a circumferential gear formed about the lower portion of turret or turntable 92 of robotic manipulator 90.

Upon assembly of backlash control rotation gear assembly 10, as mentioned above, second drive means 41 is telescoped upwardly within hollow portion 32, bore 38, and torsion spring housing 34, and a threaded fastener 72 can be attached to tapered tip 44 to further draw first drive means 41 upwardly therewithin. Prior to tightening threaded fastener 72, however, a predetermined amount of preloaded torque must be set into elastic torsion spring means 50. In order to set the predetermined torque into elastic torsion spring means 50, it must be assumed that first drive gear 65 and second drive gear 66 are in meshing contact with output driven gear 60. As mentioned above, output driven gear 60 will be driven by the first and second drive gears 65 and 66 respectively. At this point, output driven gear 60 should be locked in place to prevent its movement. Because output driven gear 60 cannot be moved, likewise first drive gear 65 and second drive gear 66 and their connected shafts 37 and 47, transfer gears 30 and 40, and drive means 31 and 41, respectively, cannot be moved.

It is further contemplated that the upper outer surface 78 of drive means connector 70 can conveniently be formed with flattened edges (e.g. similar to those of a hex nut) to enable the application of a torquing tool thereto. In this way, a torque wrench or the like can be employed to apply rotational torque to the elastic torsion spring means 50 to preload the same with the predetermined amount of torque force. Drive means connector 70 is simply twisted with such torquing tool and held in place at the desired torque level while threaded fastener 72 is turned to draw second drive means 41 upwardly thereby locking it tightly to the inner surfaces of drive means connector 70. Thereafter, the torquing tool can be removed and the predetermined amount of torque will be locked into elastic torsion spring means 50.

In this way, first drive gear 65 and second drive gear 66 are preloaded in intimate contact with output driven gear 60 by the preloaded elastic torsion spring means 50. Such preload provides constant torque to maintain the respective meshing teeth 33 and 39, 43 and 49, and the teeth of output gears 65 and 66 with teeth 61 of driven gear 60 in constant, loaded, intimate contact. Thereafter, output driven gear 60 can be released for movement.

In use, rotational movement of input means 20 is transferred directly to first transfer gear 30 by first drive means 31, while such movement is indirectly transferred to second transfer gear 40 via second drive means 41 through the elastic torsion spring means 50. Likewise such rotational movement is transferred directly to first drive gear 65 via shaft 37, and directly to second drive gear 66 via shaft 47. Drive gears 65 and 66, of course, thereby transfer such rotation to driven gear 60 which rotates the robotic turret or turntable 92 relative base 91.

To ensure elimination of backlash in these gears, it is important to preload elastic torsion spring means 50 with a sufficient amount of torque. While it is preferred that the preloaded torque of elastic torsion spring means 50 be chosen to correspond to the predetermined maximum input torque of input means 20 (e.g. preloaded torque might be equal to between about 60% and about 100% of such predetermined maximum torque), one must be careful not to design in too much prestress because elastic torsion spring means 50 will maintain that full load on the gear teeth at all times, and may require that the gears be made of special materials (e.g. hardened steel and the like) to withstand such stress. If, however, the relative torques being contemplated for the gear assembly are well within the safe operating stress for particular gear materials, it is preferred to preload the elastic torsion spring means 50 with a torque in a range between about 50% and about 120% of the known maximum input torque.

While the exact structure and manner of accomplishing the connection between first drive means 31, elastic torsion spring means 50, and second drive means 41 is not critical, an advantage of utilizing the tapered friction connection described above (e.g. tapered tip 44 and tapered drive means connector 70) is that it enables the use of friction damper 76 as shown in FIG. 1. In particular, as second drive means 41 is drawn upwardly relative first drive means 31, friction damper 76 can be compressed between the lower adjacent portions of such first and second drive means. Friction damper 76 can be made in a circular or disc-like conformation to be placed between first and second drive means 31 and 41, respectively; and can be made of any appropriate material (e.g. steel, leather, composite, etc.) to provide friction damping as well as axial compressive damping therebetween. In conjunction with a bias means 73 (e.g. Belleville springs), an axially compressive force can be maintained on friction damper 76 between such first and second drive means. In addition to damping axial shocks or other movement of second drive means 41 relative first drive means 31, damper 76 further provides a rotational friction damper to similarly dampen rotational shocks and potential differences in relative movement between first drive means 31 and second drive means 41 during quick changes in rotational speed and/or direction of such drive means. Such rotational damping action allows the elastic torsion spring means 50 to be preloaded with a torque which is less than the maximum predetermined input torque without permitting substantial backlash in the gear system by effectively absorbing relative rotational movement between first and second drive means 31 and 41.

Elastic torsion spring means 50 can be preloaded as desired, and, for example, such preload might be in a range of between about 5 foot pounds and about 50 foot pounds for many applications in robotic manipulators. It should be noted, however, that the specific preload for a given application depends to a large extent on the overall size of the drive system. Larger preloads may require special gear materials which may unnecessarily add to the cost of the gear assembly.

Figure 2:
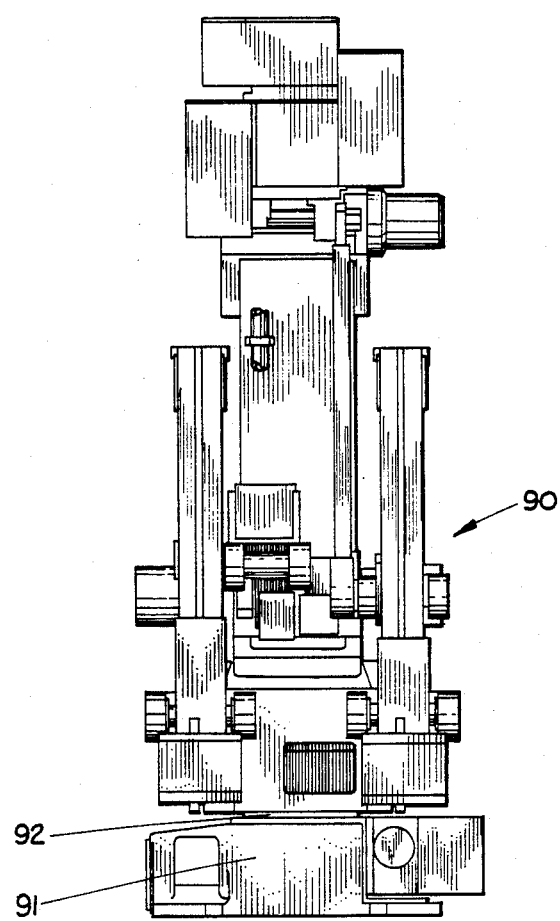
FIG. 2 is an elevation view of a robotic manipulator into which the backlash control gear assembly of the subject invention could be mounted.

In use, the backlash control rotation gear assembly 10 described above might be mounted within the base of a robotic manipulator to provide the rotational motion to the main turret portion of such robotic manipulator 90 relative to that base. In this regard, FIG. 2 shows an elevational view of an example of a robotic manipulator 90 into which the subject invention might advantageously be integrated. In robotic manipulator 90, rotation gear assembly 10 might be installed within manipulator base 91 for rotating turret portion 92 relative thereto.

For further clarification, a top view of backlash control rotation gear assembly 10 of the subject invention is illustrated in the partially broken away view of FIG. 3 as being installed within a robotic manipulator base 91. This installation is also illustrated in the cross-sectional view of FIG. 4. While assembly anchor 80 is illustrated with a particular shape for this application, it is contemplated that particular assembly anchors for mounting a gear assembly as described herein will necessarily be customized for particular applications. Also illustrated in FIG. 3 is a bevel gear 21 which meshes with rotational input means (e.g. also a bevel gear) 20, which in turn is attached to first drive means 31 (which cannot be seen from the top view of FIG. 3). Bevel gear 21 is illustrated as being attached to drive shaft 22 which is linked to rotational input source 23 by a drive belt 24. Input source 23 can be a standard electric servo-motor, and the belt drive/drive shaft means of transferring the rotational power to input means 20 is shown only as an example of the many ways in which such could be accomplished.

Figure 4:
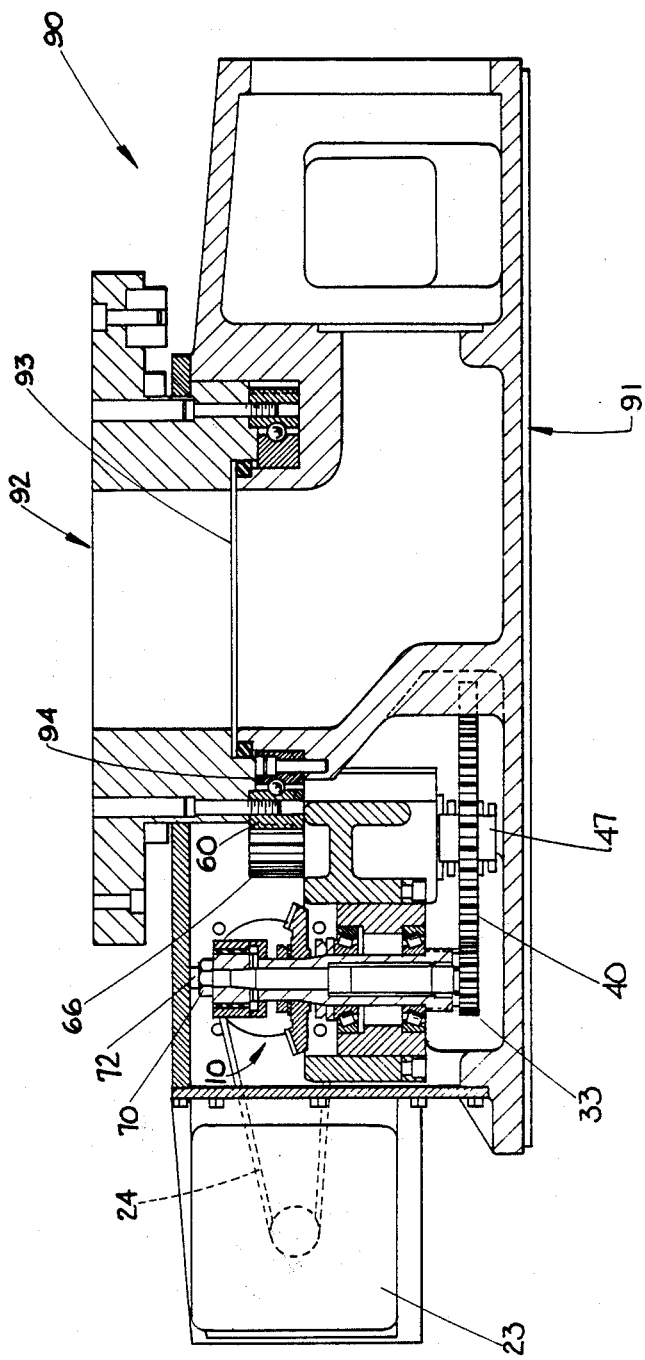
FIG. 4 is a cross-sectional view of the lower part of the robotic manipulator of FIG. 3, showing only the base and turntable portions thereof and taken along line 4—4 thereof.

Drive means connector 70 is shown with threaded fastener 72 mounted centrally therewithin, and having the flattened portions 78 formed along opposite sides thereof to facilitate application of torque to the elastic torsion spring means 50. Elastic torsion spring means 50 is shown as connecting drive means connector 70 to torsion spring housing 34, as described above with regard to FIG. 1. Assembly anchor 80 is mounted to base 91 at the anchoring means 83 (threaded bolts) and is illustrated as carrying shafts 37 and 47 for first and second transfer gears 30 and 40, respectively. It can be seen that gear teeth of first drive gear or pinion 65 and second drive gear or pinion 66, respectively, mesh with corresponding gear teeth 61 of output driven gear 60. Output driven gear 60 is shown in FIG. 4 as being mounted about the lower outer periphery of turret portion 92 adjacent the main bearing 94 upon which turret 92 rotates. It is contemplated that rotational movement imparted by drive gears 65 and 66 to output driven gear 60 would in turn cause rotational movement of the turret 92 relative base 91. Due to the constant torque imposed by elastic torsion spring means 50 and the rotational damping action of friction damper 76, the intermeshing gear teeth throughout the subject gear assembly will be held in substantially constant, loaded, intimate contact with one another, thereby obviating backlash which might otherwise be present in the system. The rotational movement of turret 92 relative base 91 will, therefore, be accurate, precise, and reliable.

Having shown and described the preferred embodiment of the present invention, further adaptions of the backlash control rotation gear assembly can be accomplished by appropriate modifications of the specific structure thereof by one of ordinary skill in the art without departing from the scope of the present invention. For example, gear assembly might be mounted within a robotic manipulator such that transfer gears 30 and 40 and their vertical drive shafts 37 and 47, respectively, could be omitted. In such case, first and second drive means might transfer rotational input directly to a corresponding pair of drive gears in direct contact with an output driven gear. Additionally, it should be understood that the antibacklash gear assembly invention described herein can equally be utilized to remove backlash from any gearing system in a robotic manipulator or the like, and is not limited to use only at the base/turret interface. Accordingly, the scope of the present invention should be considered in terms of the following claims, and is understood not to be limited to the details of structure and operation shown and described in the specification and drawings.

I claim:

1. A backlash control rotation gear assembly for robotic applications, said assembly comprising:
   (a) rotational input means to provide rotational force of a predetermined maximum torque;
   (b) first drive means, said first drive means being connected to said rotational input means;
   (c) second drive means;
   (d) elastomeric means connecting said second drive means to said first drive means, said elastomeric means being preloaded with a predetermined torque force prior to locking said elastomeric means to said first and second drive means to provide an elastomeric loaded connection between said first and second drive means; and
   (e) an output driven gear connected to a movable robotic part to be rotated, said driven gear being connected to said first and second drive means, said first drive means being driven by said rotational input means and said second drive means being driven indirectly by said rotational input means via said preloaded elastomeric connecting means, whereby said preloaded torque force of said elastomeric connecting means maintains said first and second drive means and said driven gear in loaded, substantially constant contact.

2. The gear assembly of claim 1, wherein said first drive means transfers rotational input from said rotational input means to a first drive gear, said first drive means being at least partially hollow, and wherein said second drive means is disposed radially within said hollow portion of said first drive means and being effectively connected thereto by said elastomeric connecting means, said second drive means being connected to a second drive gear.

3. The gear assembly of claim 2, wherein said first drive means is connected to said first drive gear by intermeshing gear teeth, and wherein said second drive means is similarly connected to said second drive gear by intermeshing gear teeth.

4. The gear assembly of claim 3, said assembly further comprising rotational friction damping means to effectively dampen and absorb relative rotational movement between said first and second drive means.

5. The gear assembly of claim 4, wherein said friction damping means further comprises a friction damper located between said first and second drive means, and a biasing means to maintain compressive force on said friction damper.

6. The gear assembly of claim 5, wherein said gear assembly is mounted within the base of a robotic manipulator, and said driven gear provides rotational motion to the main turret portion of said manipulator relative said base.

7. A backlash control dual rotation gear assembly for use in robotic manipulators, said assembly comprising:
   (a) rotational input means to provide rotational force of a predetermined maximum torque;
   (b) a first drive gear, said first drive gear being connected to said rotational input means by irst drive means, said first drive means having a first and second end and being at least partially hollow;
   (c) a second drive gear, said second drive gear being connected indirectly to said first drive gear by a second drive means disposed radially within said hollow portion of said first drive means, said second drive means having a first and second end;
   (d) elastomeric means connecting said second drive means adjacent one its ends to said first drive means adjacent a corresponding end of said first drive means, said elastomeric means being preloaded with a predetermined torque force prior to locking said elastomeric means to said first and second drive means to provide an elastomeric, loaded connection between said first and second drive means; and
   (e) an output driven gear connected to a movable robotic part to be rotated, said driven gear intermeshing with said first and second drive gears, wherein said first drive gear is driven by said rotational input means and said second drive gear is driven by said rotational input means and said second drive gear is driven indirectly by said rotational input means via said preloaded elastomeric connection with said first drive gear, whereby said preloaded torque force of said elastomeric connection maintains the intermeshing teeth of said first and second drive gears and said driven gear in loaded, substantially constant contact.

8. The gear assembly of claim 7, said assembly further comprising rotational friction damping means to effectively dampen and absorb relative rotational movement between said first and second drive means.

9. The gear assembly of claim 8, wherein said friction damping means further comprises a friction damper located between said first and second drive means, and a biasing means to maintain compressive force on said friction damper by said first and second drive means.

10. The gear assembly of claim 9, wherein said gear assembly is mounted within the base of a robotic manipulator, and said driven gear provides rotational motion to the main turret portion of said manipulator relative said base.

11. The gear assembly of claim 7, wherein said first drive means is connected to said first drive gear by gear teeth, and wherein said second drive means in similarly connected to said second drive gear by gear teeth.

12. The gear assembly of claim 7, wherein said first and second drive means each include a pair of corresponding transfer gears and drive shafts, said first and second drive means each being connected by intermeshing gear teeth to its respective transfer gear, and said transfer gears each being connected to its respective drive gear by a drive shaft.

13. A backlash control dual rotation gear assembly for use in robotic manipulators, said assembly comprising:
 (a) rotational input means to provide rotational force of a predetermined maximum torque;
 (b) a first drive gear, said first drive gear being connected to said rotational input means by first drive means, said first drive means having a first and second end and being at least partially hollow, said first drive gear being connected to said first drive means adjacent its second end;
 (c) a second drive gear, said second drive gear being connected indirectly to said first drive gear by a second drive means disposed radially within said hollow portion of said first drive means, said second drive means having a first and second end and being connected to said second drive gear adjacent its second end;
 (d) elastomeric means connecting said second drive means to said first drive means adjacent the first ends of the respective first and second drive means, said elastomeric means being preloaded with a predetermined torque force prior to locking said elastomeric means to said first and second drive means to provide an elastomeric, loaded connection between the first end of said first and second drive means; and
 (e) an output driven gear connected to a movable robotic part to be rotated, said driven gear being connected to said first and second drive gears by a pair of transfer gears which intermesh with said driven gear, wherein said first drive gear is driven by said rotational input means and said second drive gear is driven indirectly by said rotational input means via said elastomeric connection with said first drive gear, whereby said preloaded torque force of said elastomeric connection means maintains said first and second drive gears, said transfer gears, and said driven gear in loaded, substantially constant contact.

14. The gear assembly of claim 13, said assembly further comprising rotational friction dampling means to effectively dampen and absorb relative rotational movement between said first and second drive means.

15. The gear assembly of claim 14, wherein said friction damping means further comprises a friction damper located between said first and second drive means, and a biasing means to maintain compressive force on said friction damper.

16. The gear assembly of claim 13, wherein said gear assembly is mounted within the base of a robotic manipulator, and said driven gear provides rotational motion to the main turret portion of said manipulator relative said base.

* * * * *